US008817972B2

(12) United States Patent
Gaborit

(10) Patent No.: US 8,817,972 B2
(45) Date of Patent: Aug. 26, 2014

(54) METHOD OF AUTHENTICATION USING A DECODING OF AN ERROR CORRECTING CODE ON THE BASIS OF A PUBLIC MATRIX

(75) Inventor: Philippe Gaborit, Limoges (FR)

(73) Assignee: Centre National de la Recherche Scientifique—CNRS, Paris (FR)

( * ) Notice: Subject to any disclaimer, the term of this patent is extended or adjusted under 35 U.S.C. 154(b) by 652 days.

(21) Appl. No.: 12/665,831

(22) PCT Filed: Jun. 20, 2008

(86) PCT No.: PCT/FR2008/000871
§ 371 (c)(1),
(2), (4) Date: Oct. 6, 2010

(87) PCT Pub. No.: WO2009/016272
PCT Pub. Date: Feb. 5, 2009

(65) Prior Publication Data
US 2011/0019815 A1    Jan. 27, 2011

(30) Foreign Application Priority Data
Jun. 22, 2007 (FR) ..................................... 07 04518

(51) Int. Cl.
| | |
|---|---|
| H04L 29/06 | (2006.01) |
| G06F 21/00 | (2013.01) |
| H04L 9/30 | (2006.01) |
| H04B 1/38 | (2006.01) |
| G06F 11/08 | (2006.01) |
| G06F 11/27 | (2006.01) |
| H03M 13/39 | (2006.01) |
| G06F 11/10 | (2006.01) |
| G06F 11/30 | (2006.01) |
| H04L 25/02 | (2006.01) |

(52) U.S. Cl.
CPC .............. *H04L 9/304* (2013.01); *H04L 9/3033* (2013.01); *H04L 25/0242* (2013.01); *H04L 25/0244* (2013.01)
USPC ............... 380/28; 380/30; 380/278; 375/222; 714/752

(58) Field of Classification Search
CPC .............................. H04L 9/304; H04L 9/3033
USPC ................ 380/28, 30, 278; 375/222; 714/752
See application file for complete search history.

(56) References Cited

U.S. PATENT DOCUMENTS

| | | | |
|---|---|---|---|
| 8,051,357 B1 * | 11/2011 | Varnica .......................... | 714/752 |
| 2002/0186759 A1 * | 12/2002 | Goldstein et al. ............. | 375/222 |
| 2004/0258240 A1 * | 12/2004 | Singh .............................. | 380/30 |

FOREIGN PATENT DOCUMENTS

WO     WO 03065591 A2 *  8/2003

OTHER PUBLICATIONS

Veron, Pascal; "Improved Identification Schemes Based on Error-Correcting Codes"; Applicable Algebra in Engineering, Communication and Computing, Dec. 1997, pp. 57-69.*

(Continued)

*Primary Examiner* — Andrew Nalven
*Assistant Examiner* — Courtney Fields
(74) *Attorney, Agent, or Firm* — Arent Fox LLP

(57) ABSTRACT

The invention relates to a cryptographic method of authentication using a decoding of an error correcting code on the basis of a public matrix, in which the public matrix is a quasi-cyclic matrix. The invention pertains also to a cryptographic device comprising computation means arranged so as to implement this method. The invention makes it possible to reduce the amount of public data to be stored in a cryptographic authentication method using a decoding of an error correcting code on the basis of a public matrix.

16 Claims, 5 Drawing Sheets

(56) References Cited

OTHER PUBLICATIONS

Stern, Jacques; "A New Identification Scheme based on Syndrome Decoding"; Lecture Notes in Computer Science, vol. 773, Mar. 1994; pp. 13-21.*

Stern, Jacques; "A New Identification Scheme based on Syndrome Decoding"; Lecture Notes in Computer Science, vol. 773, Mar. 1994; pp. 1-7.*

Baldi, M.; Chiaraluce, F.; Garello, R.; Mininni, F.; "Quasi-Cyclic Low-Density Parity-Check Codes in the McEliece Cryptosystem"; Communications, 2007; ICC '07. IEEE International Conference on Digital Object Identifier: 10.1109/ICC.2007.161; Publication Year: Jul. 2007; pp. 951-956.*

PH. Gaborit, C. Laudaroux, N. Sendrier, et al, "Synd: a Very Fast Code-Based Cipher Stream with a Security Reduction", Proceedings of the 2007 IEEE International Symposium on Information Theory, [Online], 2006, pp. 186-190.

Myung S et al, "Quasi-cyclic LDPC codes for fast encoding", IEEE Transactions on Information Theory, Aug. 2005, pp. 2894-2901, vol. 51, No. 8, IEEE Service Center, Piscataway, NJ, US.

Tanner R M et al., LDPC block and convolutional codes based on circulant matrices, IEEE Transactions on Information Theory, Dec. 2004, pp. 2966-2984, vol. 50, No. 12, IEEE Service Center, Piscataway, NJ, US.

Gaborit, Philippe, et al., "Lightweight code-based identification and signature," IEEE Transactions on Information Theory (ISIT), pp. 191-195 (2007).

* cited by examiner $$C = \begin{pmatrix} c_1 & c_2 & \cdots & & c_{k-1} & c_k & \cdots & & & \\ c_k & c_{k-1} & \cdots & & c_2 & c_1 & \cdots & & & \\ \vdots & & & & & & & & & \\ c_2 & c_3 & \cdots & & c_k & c_1 & \cdots & & & \end{pmatrix}$$

Figure 3

$$A = \begin{pmatrix} a_1 \, a_2 \, \ldots \, \ldots \, a_{k-1} \, a_k \\ a_k \, a_{k-1} \, \ldots \, \ldots \, a_2 \, a_1 \\ \cdot \quad \cdot \quad \cdot \\ \cdot \quad \cdot \quad \cdot \\ \cdot \quad \cdot \quad \cdot \\ a_2 \, a_3 \, \ldots \, \ldots \, a_k \, a_1 \end{pmatrix} \quad B = \begin{pmatrix} b_1 \, b_2 \, \ldots \, \ldots \, b_{k-1} \, b_k \\ b_k \, b_{k-1} \, \ldots \, \ldots \, b_2 \, b_1 \\ \cdot \quad \cdot \quad \cdot \\ \cdot \quad \cdot \quad \cdot \\ \cdot \quad \cdot \quad \cdot \\ b_2 \, b_3 \, \ldots \, \ldots \, b_k \, b_1 \end{pmatrix}$$

Figure 5

METHOD OF AUTHENTICATION USING A DECODING OF AN ERROR CORRECTING CODE ON THE BASIS OF A PUBLIC MATRIX

CROSS-REFERENCED TO RELATED APPLICATION

This application is a National Stage entry of International Application No. PCT/FR2008/00871, filed Jun. 20, 2008, which claims priority to French Patent Application No. 0704518, filed Jun. 22, 2007, the disclosure of the prior application is incorporated in its entirety by reference.

The invention relates to a cryptographic method of authentication using a decoding of an error-correcting code on the basis of a public matrix.

The invention also relates to a cryptographic device comprising processing means arranged to implement, upon execution, such a method of authentication.

Cryptographic methods of authentication are known.

The most widespread cryptographic method of authentication is currently based on the RSA algorithm, by River, Shamir and Adleman, the security of which resides in the mathematical difficulty of factorising large integers.

However, such a cryptographic method of authentication has several disadvantages. In particular, the RSA algorithm requires the performance of calculations using very large integers, in particular discrete exponential calculations. Such calculations can be slow, in particular when performed on low-cost cryptographic devices with limited processing capability, notably smart cards or radio frequency tags.

Consequently, cryptographic methods of authentication are not currently available on such cryptographic devices.

Among the alternatives to cryptographic methods of authentication based on the RSA algorithm, cryptographic methods of authentication are known that use a decoding of an error-correcting code using a public matrix.

The invention relates more particularly to such a method.

These methods have the advantage of being the source of NP-complete mathematical problems, which are therefore very difficult to resolve. Consequently, these methods are highly secure. In addition, the calculations for decoding error-correcting codes are faster than the calculations based on the RSA algorithm.

The use of error-correcting codes in cryptography has been well known since the 1980s.

Patent application EP-A-0661846 describes such a cryptographic method of authentication using a decoding of an error-correcting code on the basis of a public matrix.

This application, as well as the publication by the applicant of this application entitled "A new identification scheme based on syndrome decoding", J. Stern 1993, describe an authentication protocol called the Stern syndrome protocol, using a very large random public matrix, typically of the order of one hundred to one thousand kilobits.

Likewise, the publication "Improved Identification schemes based on error-correcting codes", Veron, Applicable Algebra in Engineering, Communication and Computing, 1997, describes a variation of the syndrome protocol, also in the context of a cryptographic method of authentication using a decoding of error-correcting codes on the basis of a public matrix. This protocol is called the Veron protocol.

In these authentication protocols, the public matrix is random in the majority of cases, and it is therefore necessary to store all the coefficients of the matrix in a memory of the cryptographic device implementing the protocol.

However, the storage constraints for low-cost cryptographic devices do not allow such a protocol to be implemented. This is especially the case with a smart card or a radio frequency tag.

In the document "A new identification scheme based on syndrome decoding", J. Stern 1993, the author also proposes generating the public matrix in a pseudo-random manner on the basis of an initial value and a pseudo-random generator. However, the specification of a pseudo-random generator is a problem that remains unresolved to this date. Furthermore, the implementation of such a pseudo-random generator may be incompatible with the limited capacity of a low-cost cryptographic device.

The document "SYND: a very fast Code-Based Cipher Stream with a security reduction", by Gaborit et al., was presented at the ISIT 2007 conference, which started on 24 Jun. 2007, and was not accessible to the public before this date.

One aim of the invention is to provide a cryptographic method of authentication using a decoding of an error-correcting code on the basis of a public matrix that can be implemented in a low-cost cryptographic device, especially one having limited processing and/or storage capacity.

In particular, one aim of the invention is to reduce the amount of public data to be stored in a cryptographic method of authentication using a decoding of an error-correcting code on the basis of a public matrix.

Furthermore, the random matrices used in the aforementioned documents are poorly suited to quick calculations in a cryptographic device.

Another aim of the invention is to provide a cryptographic method of authentication using a decoding of an error-correcting code on the basis of a public matrix allowing quick calculations.

To achieve these aims, in the context of the invention, a new type of public matrix is put forward.

In particular, these aims are achieved according to the invention thanks to the fact that the public matrix is a quasi-cyclic matrix.

A quasi-cyclic matrix is known to be a matrix comprising a juxtaposition of circulant blocks, in which shifts from one row to another take place by circular permutation.

Consequently, to store all the information in the public matrix, it is sufficient to store a base row of each circulant block, the rest of the block being deduced from this base row by a permutation. The amount of data to be stored in the method of authentication is therefore greatly reduced.

Moreover, the multiplications of a vector by a quasi-cyclic matrix are quick, thanks to the properties of the circulant blocks. And yet, the cryptographic method of authentication using a decoding of an error-correcting code implements such multiplications. This means that the method according to the invention makes it possible to improve the speed of the cryptographic calculations.

The method of authentication according to the invention is therefore easy to implement in a cryptographic device, even if this cryptographic device has limited storage and processing capacities.

The method of authentication according to the invention has the additional advantage of providing a public matrix that can be compatible with the protocols described in the publications mentioned above, in other words the protocols for decoding using the Stern syndrome, and the dual protocol for decoding using the Stern syndrome, described by Veron.

According to a first embodiment of the invention, the quasi-cyclic matrix comprises k rows and 2 k columns and is a juxtaposition of an identity block of size k*k, and a circulant block of size k*k.

In this case, the private key of the authentication method is a word X of size 2 k. The public data include a syndrome s of size k, and half the first row of the quasi-cyclic matrix of size k. A syndrome-decoding protocol can then be implemented from 4 k bits.

In this embodiment of the invention, the circulant block can be defined by a random vector of size k.

The public matrix in this first embodiment can be used as a public matrix in the Stern or Veron protocols.

In a second embodiment of the invention, the public matrix is constructed on the basis of a quasi-cyclic intermediate matrix comprising k rows and 2 k columns, the intermediate matrix consisting of a juxtaposition of one from a first circulant square block of size k, and one from a second circulant square block of size k, the intermediate matrix having the form G'=[A|B], the public matrix being constructed by multiplying to the left the intermediate matrix by the inverse matrix of block A, so that the public matrix has the form $G=[I|A^{-1}.B]$, where the matrix $A^{-1}$ is the inverse matrix of block A.

In this second embodiment of the invention, the first circulant block and the second circulant block are respectively defined by a first vector and a second vector, the vector formed by the first vector and the second vector being of low order.

The first vector and the second vector can be random with this order constraint.

In this second embodiment of the invention, the public matrix can be used in particular as a public matrix in a Veron protocol.

In this case, the secret of the Veron protocol consists of the transposed column vector of the row vector made up of the first vector and the second vector.

This vector corresponds to a private key of size 2 k. The public data can then be determined on the basis of circulant blocks induced by the private key for a size k. A decoding protocol can then be implemented from 3 k bits.

The invention also relates to a computer program containing instructions arranged so as to implement, on execution, the method of authentication such as previously described.

The invention also relates to a cryptographic device comprising processing means arranged to implement the method of authentication such as previously described.

The invention also relates to a smart card comprising such a cryptographic device.

Below is a description of the various embodiments of the invention in relation to the appended figures, wherein:

FIG. 3 represents an example of a matrix block making up the matrix depicted in FIG. 2;

FIG. 5 represents an example of a matrix block forming the intermediate matrix depicted in FIG. 4.

Figure 1:
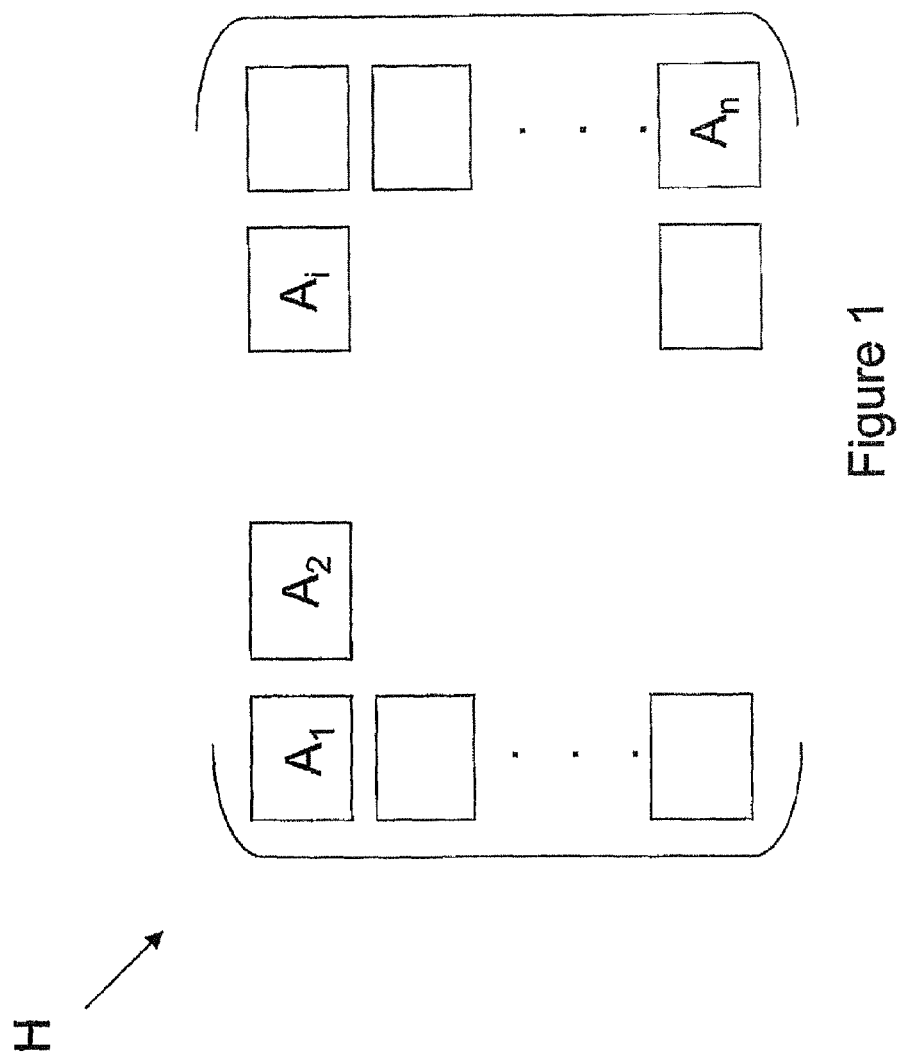
FIG. 1 is a general representation of a quasi-cyclic matrix.

The cryptographic method of authentication using a decoding of an error-correcting code on the basis of a public matrix according to the invention can be implemented with the help of the Stern syndrome-decoding protocol.

This protocol is entirely described in patent application EP-A-0661846 and in the aforementioned publication "A new identification scheme based on syndrome decoding", J. Stern 1993. It is also well known to those skilled in the trade in the field of cryptography by error-correcting code.

These documents will be consulted for implementing this protocol.

Below is a reminder of the main steps of the Stern protocol. In Stern syndrome decoding, two entities contain a public matrix H made up of binary elements. The private code is then a low-order word, and the public key is the product of the public matrix by this word.

To perform the authentication, with the Stern protocol, we consider an entity P, the prover, which wants to authenticate itself with a verifier V. A succession of turns takes place, in which each correct execution increases the probability of the identity of P being true. Each turn consists of a first step in which the prover P sends an engagement to the verifier V, which then sends back a challenge to P in a second step. In a third step, the prover P sends a reply to the verifier V, which verifies that the reply of the prover P is in agreement with its public key.

The link between the public key of P and its secret key is based on the problem of syndrome decoding. The processing details of the operations of the aforementioned Stern protocol are well known to those skilled in the trade, who may consult the aforementioned article as required.

Likewise, those skilled in the trade know the Veron protocol and may refer to the document "Improved Identification scheme based on error-correcting codes", Veron, Applicable Algebra in Engineering, Communication and Computing, 1997, as required for implementation of the Veron protocol.

The main steps of the Veron protocol are summarised below.

To perform authentication using the Veron protocol, the major steps are the same as for the Stern protocol, the difference being found in the calculations performed at each step, which are slightly different. In particular, the link between the public key and the private key is based on finding a low-order word associated with a certain matrix or error-correcting code.

In these documents, a public matrix is described. According to the invention, the protocol is implemented as in the aforementioned documents, replacing the public matrix described in these documents with the public matrices described hereunder. They type of public matrix which can be used in each of the aforementioned protocols is described below.

In particular, the matrix H described hereunder in the first embodiment of the invention can be used equally as a public matrix in the Stern or Veron protocols, and the matrix G described in the second embodiment of the invention can be used in the Veron protocol.

According to the invention, the public matrix is a quasi-cyclic matrix, meaning that it comprises a juxtaposition of circulant blocks. FIG. 1 contains a general representation of such a quasi-cyclic matrix H, made up of circulant square blocks $A_1, A_2, \ldots, A_n$. Each one of these blocks is defined on the basis of a base vector by permutations.

Figure 2:
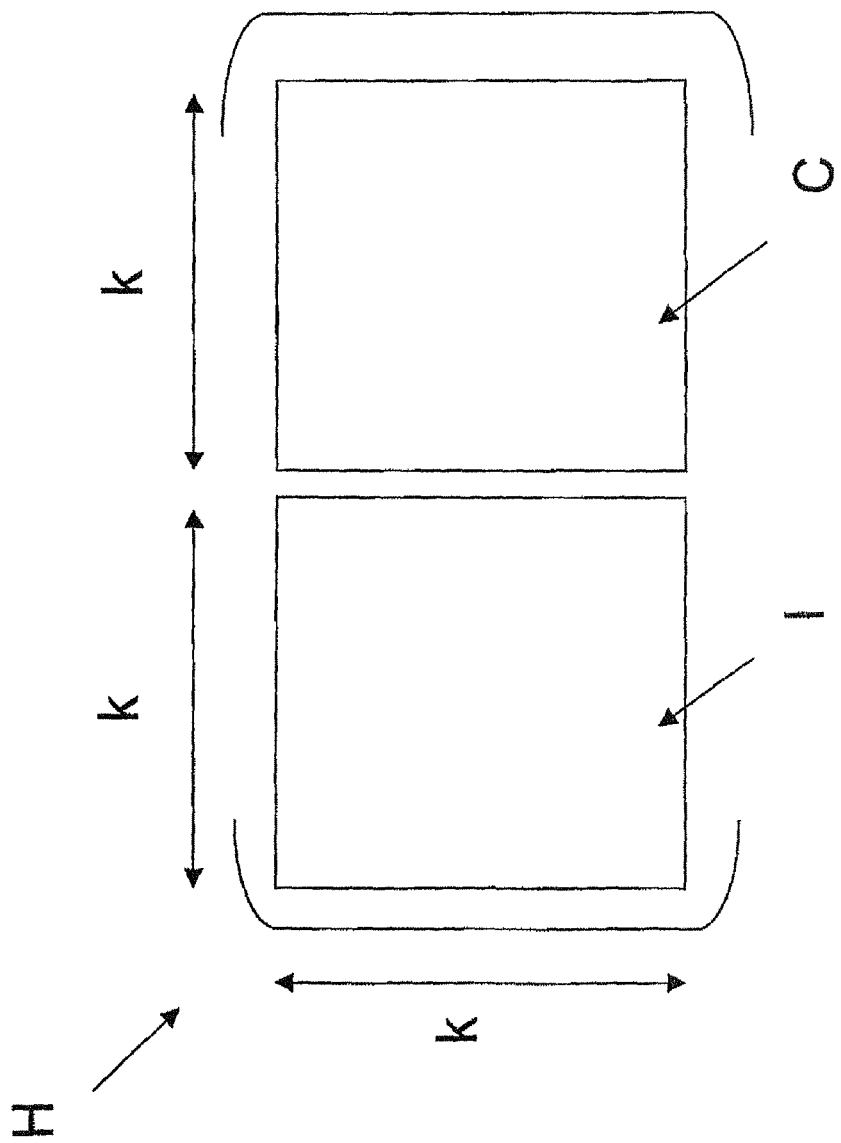
FIG. 2 represents a public matrix to be used in a method of authentication according to a first embodiment of the invention.

As shown in FIG. 2, according to a first embodiment of the invention, the public matrix H is of the same type as the matrix described above in relation to FIG. 1, and includes k rows and 2 k columns. It consists of a square identity matrix I of size k and of a circulant square matrix C of size k made up of 0s and 1s. The matrix H therefore has the form H=[I|C].

The circulant matrix C is described in greater detail in relation to FIG. 3. It includes a first line consisting of a random vector $[c_1, c_2, \ldots, c_{k\,1}, c_k]$, with $c_i$ having a value of 0 or 1. The subsequent rows are determined by successive permutations of the first row, so that the matrix C is entirely determined by its first row.

This public matrix H can be used as a public matrix in the Stern and Veron protocols mentioned above.

Figure 4:
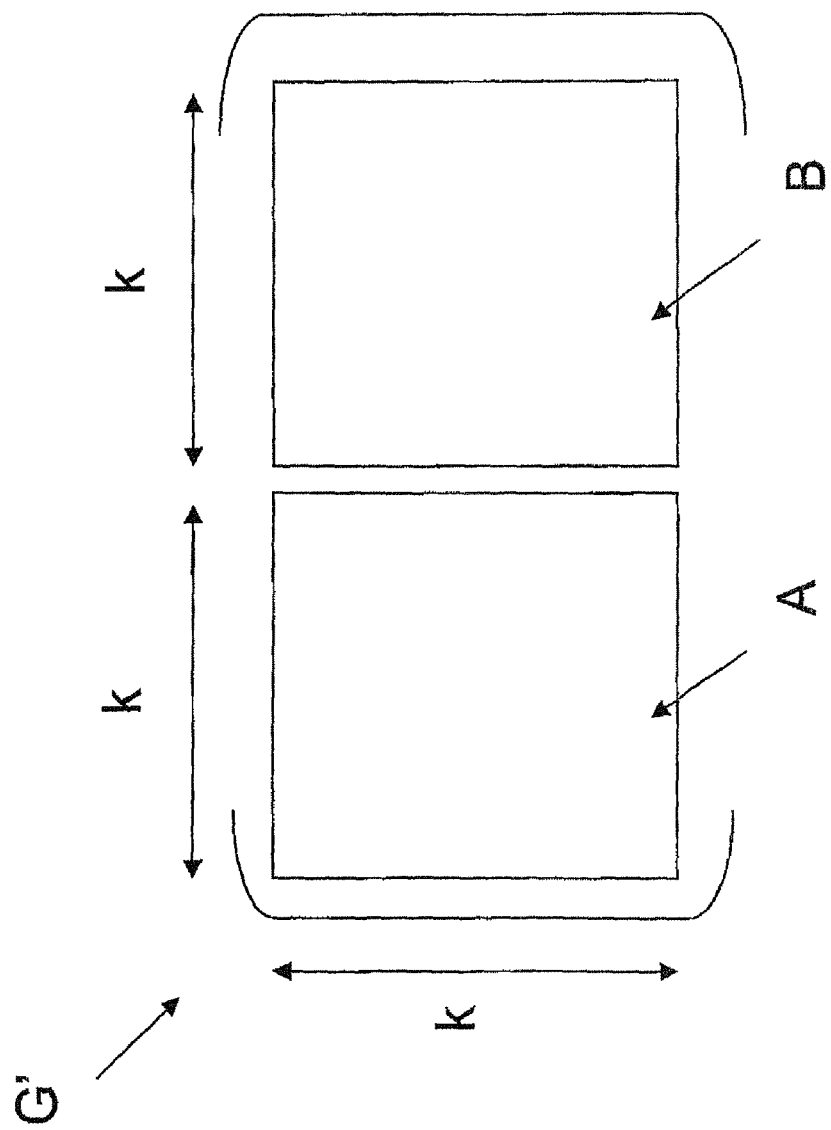
FIG. 4 represents an intermediate matrix of the low-order words used to construct the public matrix to be used in a method of authentication according to a second embodiment of the invention.

In a second embodiment of the invention, a quasi-cyclic intermediate matrix G' is defined, comprising k rows and 2 k columns. It consists of a first circulant square matrix A of size k, and a second circulant square matrix B of size k. This intermediate matrix G' is depicted in FIG. 4. The matrix G' therefore has the form G'=[A|B]. The public matrix G=[I| $A^{-1}$.B] is then constructed, made up of a first identity block and a second block consisting of multiplying the matrix B to the left by the inverse matrix of A, marked $A^{-1}$. Subsequently, the matrix resulting from the product $A^{-1}$.B will be marked D.

The matrix G such as described above is used as a public matrix in the Veron protocol.

Matrices A and B are depicted in FIG. 5 and are respectively defined on the basis of their first respective rows a=[$a_1$, $a_2$, ..., $a_{k-1}$, $a_k$] and b=[$b_1$, $b_2$, ..., $b_{k-1}$, $b_k$], $a_i$ and $b_i$ having values 0 or 1. These first two rows are random vectors, chosen so that the vector [a,b] meets the order condition in the Veron protocol.

In this case, the private data in the Veron protocol is the vector $^t$[a,b] of size 2 k, in other words the transposed column vector of the row vector [a,b] and the public data is the vector describing the matrix D of size k, in other words, the first row of the matrix D.

The advantage of this second embodiment of the invention is that the low-order secret datum $^t$[a,b] is directly described in the public matrix.

According to the invention, the use of the matrices described above in a Veron or Stern protocol for the first embodiment of the invention, and especially in the Veron protocol in the second embodiment of the invention, makes it possible to maintain the security constraints imposed for cryptographic protocols.

In particular, it is known that a code is secured against the usual attacks when its parameters are below the Gilbert-Varshanov limit.

In the first embodiment of the invention, for a secret X with order w, if the order w is chosen to be just under the Gilbert-Varshanov limit, k is chosen so that the cost of finding a word X with order w in a code of parameters [2 k, k] is at least $2^{80}$.

An example of parameters meeting these conditions for the quasi-cyclic matrix of the first embodiment of the invention is k=317, w=69, which gives a public datum with a size of 634 corresponding to a syndrome s, and a private datum with a size of 951 corresponding to the secret of size 2 k, and to the first row of the matrix C. In this case, the matrix H is such that HX=s, where s is the syndrome, X is the secret key, and H is the public matrix.

In the second embodiment of the invention, the vector x=[a,b] is chosen, with order w below the Gilbert-Varshanov limit, and for example k=347, w=76, providing a private datum $^t$x=$^t$[a,b] with a size of 694 bits, and a public datum, defined by the first row of the matrix D, with a size of 347 bits.

Thus, the use of quasi-cyclic matrices according to the invention makes it possible to reduce the size of the matrices compared with the usual sizes in the Stern or Veron protocols, typically from several hundred kilobits to around 300 bits.

The cryptographic method of authentication using a decoding of an error-correcting code on the basis of a quasi-cyclic matrix according to the invention can be implemented easily in a cryptographic device, for the Veron or Stern protocol.

In particular, the matrix H described in the first embodiment of the invention can be used equally in the Stern protocol or in the Veron protocol, and the matrix G described in the second embodiment of the invention can be used in the Veron protocol.

To do so, a processor is programmed to implement the aforementioned protocols with the quasi-cyclic matrix or matrices described above. The cryptographic device also includes memories for storing the data during the cryptographic calculations.

Thanks to the fact that the method according to the invention enables a reduction in the size of the matrices used for decoding error-correcting codes, such a cryptographic device can be, for example, the chip of a smart card.

The invention claimed is:

1. Cryptographic method of authentication executed by an apparatus including a processor and a memory, the method comprising: using a decoding of an error-correcting code on the basis of a public matrix in which a private key is a low-order word and an associated public key is the product of the public matrix with the private key, wherein the public matrix is a random quasi-cyclic matrix, wherein the processor performs the decoding, and wherein the public matrix (H) comprises k rows and 2 k columns and is a juxtaposition of an identity block of size k*k, and a circulant block of size k*k.

2. Method according to claim 1, wherein the public matrix (H) is a matrix of type H=[I|C], wherein I is the identity matrix of size k*k and C is the circulant block of size k*k.

3. Method according to claim 2, wherein the circulant block is defined by a vector of random size k.

4. Method according to claim 1, wherein the circulant block is made up of binary data.

5. Method according to claim 1, wherein the number k is equal to 317.

6. Method according to claim 1, wherein the quasi-cyclic matrix is used in a Stern protocol or in a Veron protocol.

7. Method according to claim 1, wherein the public matrix is constructed on the basis of a quasi-cyclic intermediate matrix (G') comprising k rows and 2 k columns, the intermediate matrix (G') consisting of a juxtaposition of one from a first circulant square block A of size k, and one from a second circulant square block B of size k, the intermediate matrix having the form G'=[A|B], the public matrix being constructed by multiplying to the left the intermediate matrix by the inverse matrix of the block A, so that the public matrix has the form G=[I|A-1.B], the matrix A-1 being the inverse matrix of block A.

8. Method according to claim 7, wherein the first circulant block and the second circulant block are respectively defined by a first vector and a second vector, the vector formed by the first vector and the second vector being of low order.

9. Method according to claim 8, wherein the first vector and the second vector are random.

10. Method according to one of the claims from 7 to 9, wherein the public matrix is used as the public matrix in a Veron protocol.

11. Method according to claim 10, wherein the secret of the Veron protocol consists of the transposed column vector of the row vector made up of the first vector and the second vector.

12. A computer program product, comprising:
a non-transitory computer-readable medium comprising:
at least one instruction for causing a computer to perform a cryptographic method of authentication using a decoding of an error-correcting code on the basis of a public matrix in which a private key is a low-order word and an associated public key is the product of the public matrix with the private key, wherein the public matrix is a random quasi-cyclic matrix, and wherein the public matrix (H) comprises k rows and 2 k columns and is a juxtaposition of an identity block of size k*k, and a circulant block of size k*k.

13. A computer program product, comprising:

a non-transitory computer-readable medium comprising:
- at least one instruction for causing a computer to perform a cryptographic method of authentication using a decoding of an error-correcting code on the basis of a public matrix in which a private key is a low-order word and an associated public key is the product of the public matrix with the private key, wherein the public matrix is a random quasi-cyclic matrix, and
- wherein the public matrix is constructed on the basis of a quasi-cyclic intermediate matrix (G') comprising k rows and 2 k columns, the intermediate matrix (G') consisting of a juxtaposition of one from a first circulant square block A of size k, and one from a second circulant square block B of size k, the intermediate matrix having the form G'=[A|B], the public matrix being constructed by multiplying to the left the intermediate matrix by the inverse matrix of the block A, so that the public matrix has the form G=[I|A-1.B], the matrix A-1 being the inverse matrix of block A.

14. A cryptographic device, comprising:

means for performing a cryptographic method of authentication using a decoding of an error-correcting code on the basis of a public matrix in which a private key is a low-order word and an associated public key is the product of the public matrix with the private key, wherein the public matrix is a random quasi-cyclic matrix, and wherein the public matrix (H) comprises k rows and 2 k columns and is a juxtaposition of an identity block of size k*k, and a circulant block of size k*k.

15. A cryptographic device, comprising:

means for performing a cryptographic method of authentication using a decoding of an error-correcting code on the basis of a public matrix in which a private key is a low-order word and an associated public key is the product of the public matrix with the private key, wherein the public matrix is a random quasi-cyclic matrix, and wherein the public matrix is constructed on the basis of a quasi-cyclic intermediate matrix (G') comprising k rows and 2 k columns, the intermediate matrix (G') consisting of a juxtaposition of one from a first circulant square block A of size k, and one from a second circulant square block B of size k, the intermediate matrix having the form G'=[A|B], the public matrix being constructed by multiplying to the left the intermediate matrix by the inverse matrix of the block A, so that the public matrix has the form G=[I|A-1.B], the matrix A-1 being the inverse matrix of block A.

16. The cryptographic device of claim 15, wherein the cryptographic device is a smartcard.

* * * * *